Patented Nov. 3, 1942

2,301,117

UNITED STATES PATENT OFFICE 2,301,117

VULCANIZATION OF RUBBER

Albert F. Hardman, Akron, Ohio, assignor to Wingfoot Corporation, Wilmington, Del., a corporation of Delaware No Drawing. Application November 23, 1940, Serial No. 366,883

2 Claims. (Cl. 260—793)

This invention relates to the vulcanization of rubber. It includes the process of vulcanizing in the presence of certain accelerators, and also in the presence of such accelerators together with a basic type accelerator, and the vulcanized rubber products thus obtained.

The accelerator used in carrying out this invention is formed by reacting (1) a naphthol, (2) an aldehyde and (3) an aliphatic, aromatic or alicyclic compound which may, for example, be a dithio acid, such as dithio acetic acid, dithiofuroic acid, a dithionaphthoic acid or dithiobenzoic acid or its homologs, including dithio phenyl benzoic acid. The reaction is applicable to other reactants, for example, instead of a dithio acid one may employ a substituted amine, e. g., sodium-diethyl-dithiocarbamate or a thiazole, such as 2-mercaptobenzothiazole, 4-methyl-2-mercaptothiazole, 4-ethyl-2-mercaptothiazole, 2-mercaptothiazoline and 4,5-dimethyl-2-mercaptothiazole. The compounds formed with the thiazoles, except 2-mercaptobenzothiazole, are new compounds, and their use as accelerators is new. As the aldehyde, paraformaldehyde (water-free) is preferred. Formaldehyde may be used. The naphthol may be alpha or beta naphthol or a substituted derivative thereof.

Generally speaking a catalyst is required for the reaction. An alkaline or basic catalyst is used, and as it must be soluble in the reaction mass an organic compound will be preferred, such as hexamethylenetetramine, quinoline, piperidine, lutidine, quinaldine or dimethylaniline.

The invention will be further described in connection with the following examples:

EXAMPLE 1

The following compounds are mixed in the following proportions.

| | |
|---|---|
| 2-hydroxy-dithionaphthoic acid parts by weight | 39 |
| Beta-naphthol do | 30 |
| Paraformaldehyde do | 6.5 |
| Toluene do | 215 |
| Piperidine (as a catalyst) | Trace |

The ingredients are refluxed with a water trap until about 3.5 to 4.0 parts by weight of water has been collected. The reacted mix is then filtered and the solvent evaporated. In one instance this yielded 50 parts by weight of orange-red crystals which melted at 142-3° C.

Analysis: Sulfur found was 16.77 and 16.81%. Calculated to $C_{22}H_{16}O_2S_2$, the sulfur equals 17.0%. The formula, therefore, appears to be:

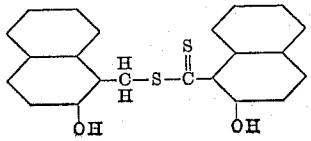

Other dithio acids, such as those above mentioned may be similarly reacted to produce a product having the general formula $R.CH_2.S.C.(:S)R_1$ where R is a naphthol nucleus, and $R_1$ may be aliphatic or aromatic.

This accelerator was used for the acceleration of rubber in the following formula:

| | |
|---|---|
| Rubber parts by weight | 100 |
| Sulfur do | 3 |
| Zinc oxide do | 5 |
| Accelerator do | 0.5 |
| Diphenylguanidine do | 0.2 |

Instead of diphenylguanidine, ditolylguanidine or any basic type accelerator may be used. The curing data obtained with samples employing this formula were as follows:

| Cure in minutes degrees F. | Tensile | Elongation | Modulus 500% |
|---|---|---|---|
| 20′ at 240° | 61 | 965 | 8 |
| 30′ at 240° | 135 | 845 | 18 |
| 40′ at 240° | 178 | 825 | 24 |
| 60′ at 240° | 230 | 800 | 33 |
| 80′ at 240° | 215 | 760 | 37 |

EXAMPLE 2

| | |
|---|---|
| Captax grams | 34 |
| Beta-naphthol do | 30 |
| Paraformaldehyde do | 6.5 |
| Toluene cc | 250 |
| Piperidine drops | 5 |

The above ingredients were refluxed with a water trap about ten minutes until 3.5 c. c. water had been collected. The solution was then filtered hot, and cooled. Crystals separated. These were filtered, washed with benzene and petroleum ether.

The yield was 47.5 g., melting at 156° C. Recrystallized twice from benzol, a sample melted at 157° and was found to contain 20.17% and 20.20% sulfur. Calculated to $C_{18}H_{13}ONS_2$, sulfur=19.8%.

*Formula*

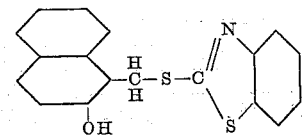

Tested in the above rubber mix the following curing data were obtained:

| Cure in minutes degrees F. | Tensile | Elongation | Modulus 500% |
|---|---|---|---|
| 20′ at 260° | 195 | 825 | 25 |
| 30′ at 260° | 215 | 775 | 33 |
| 40′ at 260° | 226 | 775 | 39 |
| 60′ at 260° | 248 | 750 | 45 |
| 80′ at 260° | 257 | 750 | 48 |

Example 3

| | | |
|---|---|---|
| Alpha-naphthol | grams | 36 |
| Captax | do | 42 |
| Paraformaldehyde | do | 8 |
| Benzol | c. c. | 150 |
| Piperidine | drops | 4-5 |

The above ingredients were refluxed with a water trap until 4.5 c. c. water had been collected. Filtered and cooled this yielded 31 g. of crystals melting at 138° C.

Recrystallized from benzol, a sample melted at 139-40° and was found to contain 19.87 and 19.88% sulfur. Calculated to $C_{18}H_{13}ONS_2$, sulfur=19.8%.

*Formula*

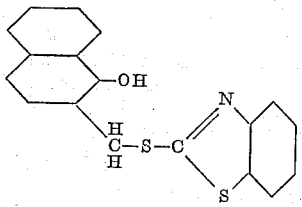

Tested in the above rubber mix the following curing data were obtained:

| Cure in minutes, degrees F. | Tensile | Elongation | Modulus 500% |
|---|---|---|---|
| 20' at 260° | 146 | 780 | 23 |
| 30' at 260° | 171 | 770 | 28 |
| 40' at 260° | 169 | 795 | 25 |
| 60' at 260° | 154 | 780 | 24 |
| 80' at 260° | 149 | 780 | 24 |

Example 4

| | | |
|---|---|---|
| Sodium-diethyl-dithiocarbamate | grams | 17 |
| Beta-naphthol | do | 14.5 |
| Water | c. c. | 100 |
| 37% Formaldehyde | grams | 9 |
| $NaHCO_3$ | do | 9 |

These were stirred together, warming gently. The beta-naphthol went partly into solution, followed by the precipitation of a new, solid material.

The yield was 24 g. Recrystallized from alcohol, the product was found to melt at 140° C. and by mixed melting point proved to have the following formula:

*Formula*

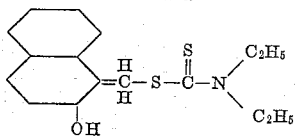

Example 5

| | | |
|---|---|---|
| 4-ethyl-2-mercapto thiazole | grams | 72.5 |
| Beta-naphthol | do | 72 |
| Benzol | c. c. | 150 |
| Piperidine | drops | 10 |
| Paraformaldehyde | grams | 15 |

This mixture was refluxed one hour, until 9.0 c. c. water had been collected. The filtrate was cooled and crystals separated. The yield was 70 g., melting at 110° C.

The formula is believed to be:

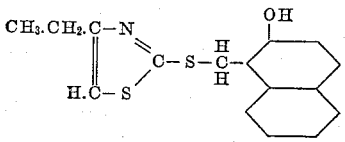

Samples prepared according to the vulcanizing formula given in Example One gave the following test data:

| Cure in minutes, degrees F. | Tensile | Elongation | Modulus 500% |
|---|---|---|---|
| 30' at 240° | 103 | 900 | 12 |
| 40' at 240° | 131 | 835 | 17 |
| 60' at 240° | 165 | 780 | 27 |
| 80' at 240° | 180 | 750 | 33 |

Example 6

| | | |
|---|---|---|
| 2-mercapto thiazoline | grams | 24 |
| Beta-naphthol | do | 29 |
| Benzol | c. c. | 100 |
| Piperidine | drops | 5 |
| Paraformaldehyde | grams | 6.5 |

This mixture was refluxed with a water trap about one hour, 3.0 c. c. of water collecting in the trap. The solution was allowed to stand over night and crystals separated. These were filtered off, washed with benzene and dried.

The yield was 21 g. of material with a melting range about 170°. The crystals were boiled up in 100 c. c. of alcohol, in which they were only partly soluble, the mixture cooled and filtered. 14 g. of crystals were obtained, melting at 180-1°.

Samples prepared according to the vulcanizing formula given in Example One gave the following test data:

| Cure in minutes, degrees F. | Tensile | Elongation | Modulus 500% |
|---|---|---|---|
| 30' at 260° | No cure | | |
| 40' at 260° | 33 | 910 | 6 |
| 60' at 260° | 56 | 940 | 8 |
| 80' at 260° | 80 | 895 | 11 |
| 120' at 260° | 103 | 870 | 14 |

In the claims "thiazole" is used in a restricted sense and excludes aryl thiazoles.

What I claim is:

1. Rubber vulcanized in the presence of an accelerator having the formula $R.CH_2.S.C(:S)R_1$ where R is a naphthol group and $-S.C(:S)R_1$ is a dithio acid group.

2. The process which comprises vulcanizing rubber in the presence of both a basic type accelerator and an accelerator having the formula $R.CH_2.S.C(:S)R_1$ where R is a naphthol group and $-S.C(:S)R_1$ is a dithio acid group.

ALBERT F. HARDMAN.

CERTIFICATE OF CORRECTION.

Patent No. 2,301,117.  November 3, 1942.

ALBERT F. HARDMAN.

It is hereby certified that error appears in the printed specification of the above numbered patent requiring correction as follows: Page 1, second column, in the table at the bottom of the page, third figure under the heading "Elongation", for "775" read --755--; and that the said Letters Patent should be read with this correction therein that the same may conform to the record of the case in the Patent Office.

Signed and sealed this 29th day of December, A. D. 1942.

(Seal)

Henry Van Arsdale,
Acting Commissioner of Patents.